Oct. 23, 1951     G. B. LITCHFORD ET AL     2,572,041
SELECTIVE AZIMUTH SIGNALING SYSTEM
Filed Oct. 29, 1947     5 Sheets-Sheet 1
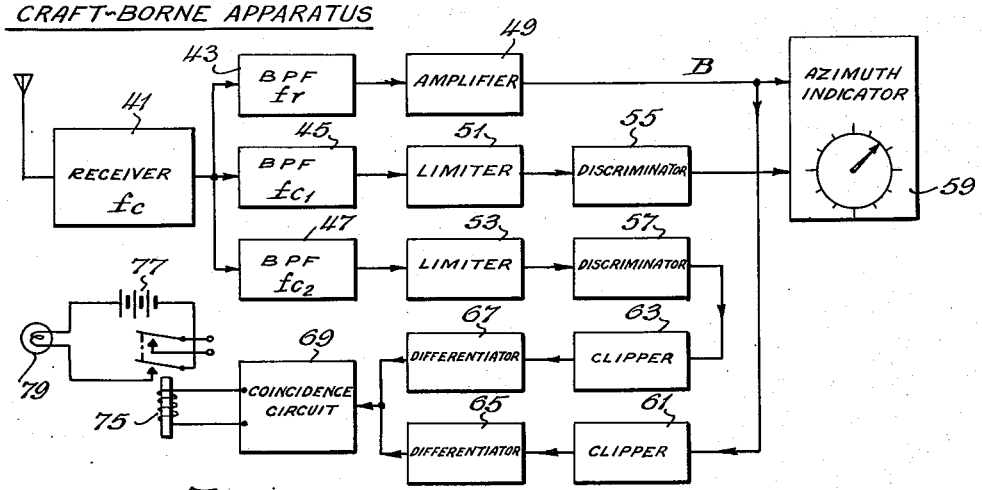
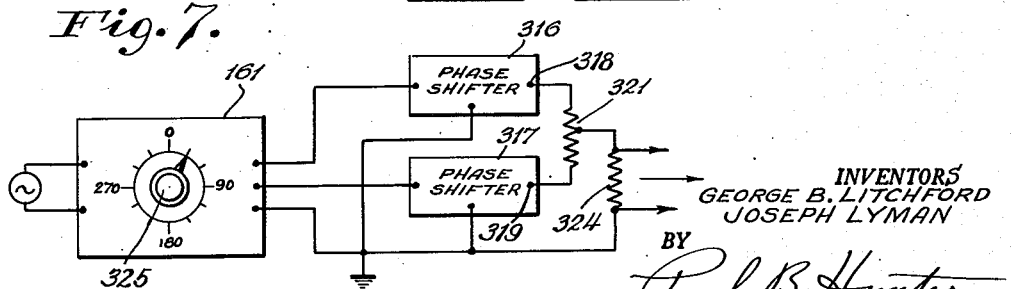
INVENTORS
GEORGE B. LITCHFORD
JOSEPH LYMAN
BY
*Paul B. Hunter*
ATTORNEY Oct. 23, 1951     G. B. LITCHFORD ET AL     2,572,041
SELECTIVE AZIMUTH SIGNALING SYSTEM
Filed Oct. 29, 1947     5 Sheets—Sheet 2

INVENTORS
GEORGE B. LITCHFORD
JOSEPH LYMAN
BY
ATTORNEY

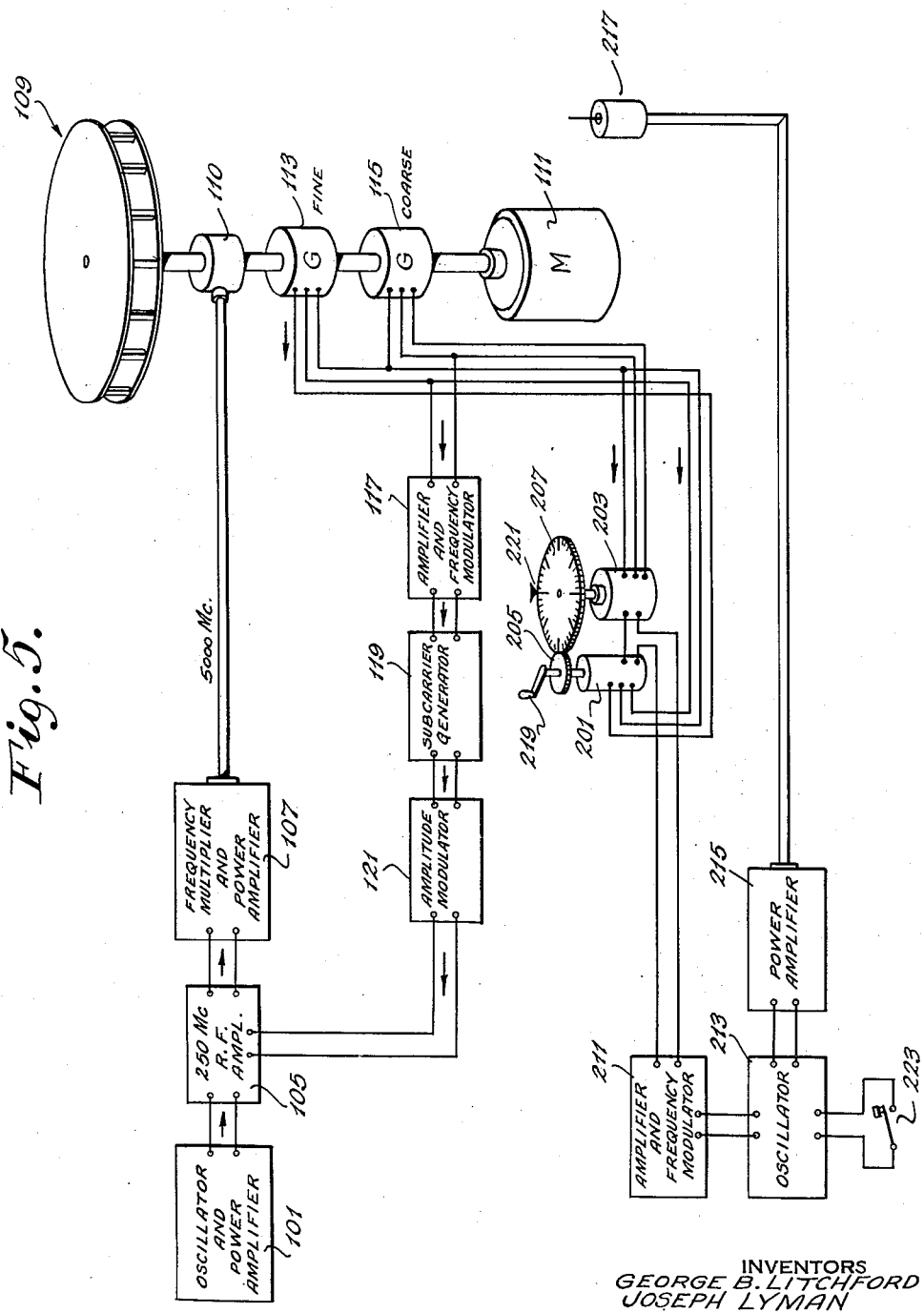

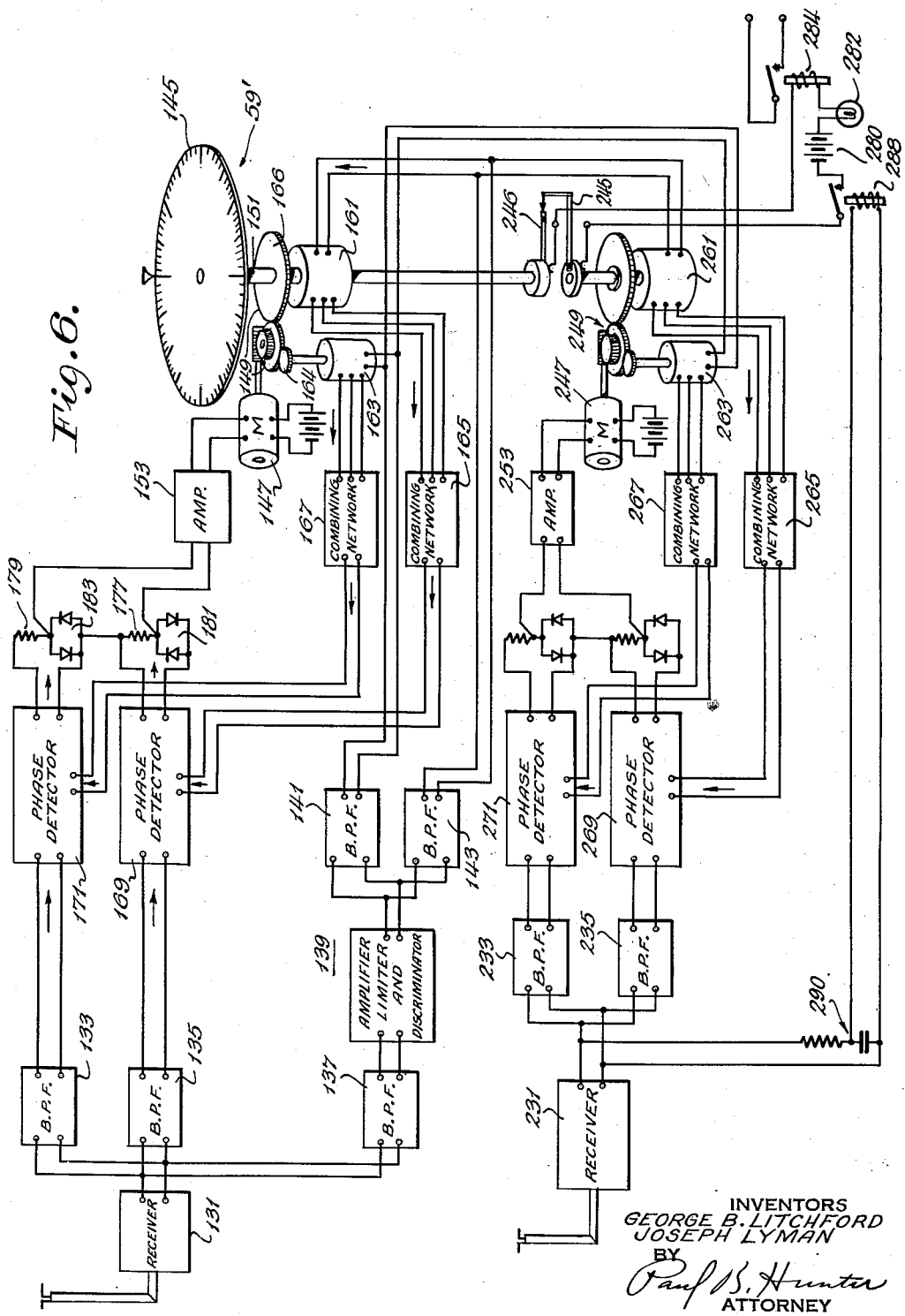

Oct. 23, 1951  G. B. LITCHFORD ET AL  2,572,041
SELECTIVE AZIMUTH SIGNALING SYSTEM
Filed Oct. 29, 1947  5 Sheets-Sheet 5
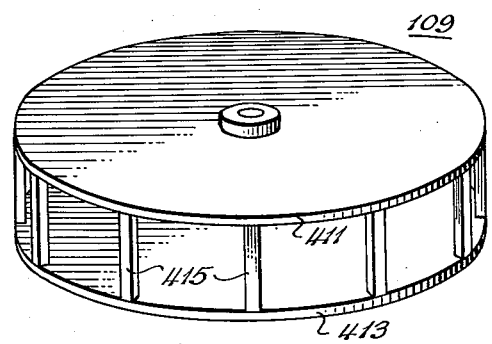
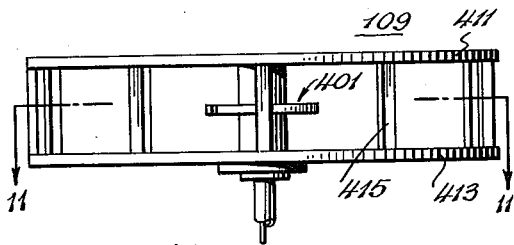
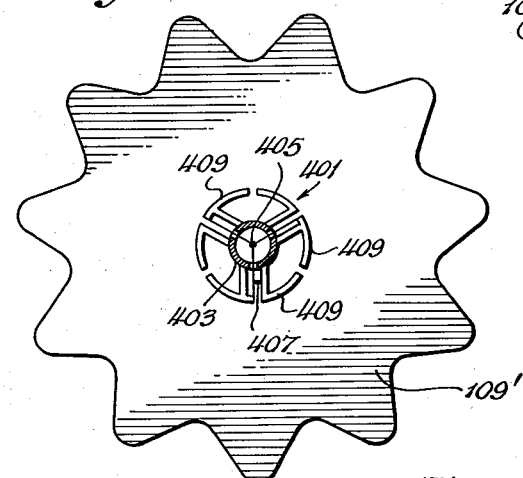
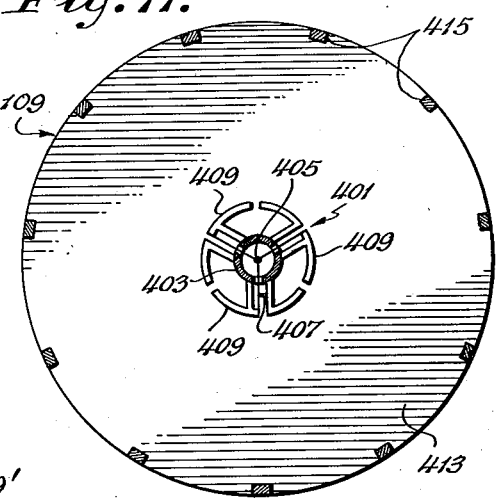
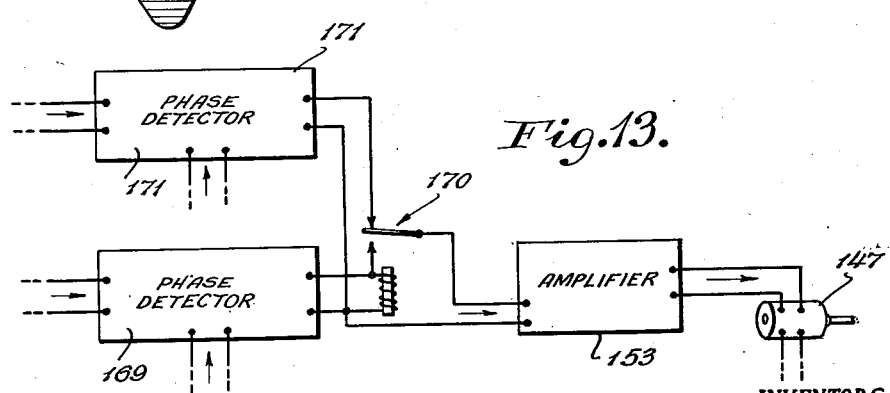
INVENTORS
GEORGE B. LITCHFORD
JOSEPH LYMAN
BY
ATTORNEY Patented Oct. 23, 1951

2,572,041

UNITED STATES PATENT OFFICE 2,572,041

SELECTIVE AZIMUTH SIGNALING SYSTEM

George B. Litchford and Joseph Lyman, Huntington, N. Y., assignors to The Sperry Corporation, a corporation of Delaware Application October 29, 1947, Serial No. 782,723

11 Claims. (Cl. 343—106)

1

The present invention is concerned with navigational and traffic control aids for movable craft such as aircraft, and is particularly concerned with an arrangement for signalling a craft in a selected direction, to the exclusion of craft in all other directions.

An object of the invention is to provide improved selective aircraft signalling apparatus.

A more specific object is to provide an arrangement whereby an operator at a control station may select a particular one of several craft in the vicinity of the station, and may operate an electric circuit in the craft or cause an annunciator in the craft to inform the operator therein that a message being communicated is particularly intended for him.

Another object is to provide an annunciator system so combined and interrelated with an azimuth indicating system that the principal parts of the combined systems serve dual functions for azimuth direction and annunciator purposes, resulting in economy and improved reliability.

Annunciation for a selected craft, such as an aircraft is achieved in this invention by radio transmission to the aircraft of a modulation wave having a selected phase relative to the phase of rotation of an asymmetrical rotation pattern, and by provision of a receiving system in the aircraft through which amplitude variations due to rotation of the asymmetrical distribution pattern are compared with the selected phase signal in a phase comparison apparatus so arranged as to cause annunciation only when a predetermined relative phase condition exists between these waves.

This system will be more clearly understood by reference to the following detailed description of embodiments of the invention given in relation to the drawings, wherein Fig. 1 is a diagram of the transmitting apparatus and Fig. 2 is a diagram of the receiving apparatus which cooperate to achieve selective azimuthal annunciation according to one embodiment of the present invention;

Fig. 5 is a diagram of transmitting apparatus and Fig. 6 is a diagram of receiving apparatus according to a modified embodiment of the selective azimuthal annunciation system designed for more precise azimuthal selection;

2

Figure 8:
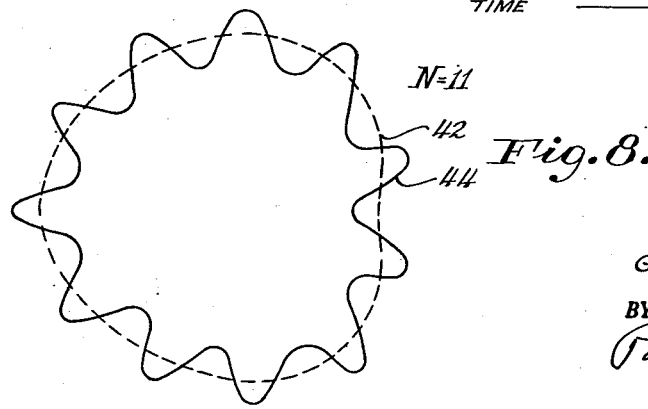

Fig. 7 is a circuit diagram illustrating a phase shifter used in the receiving apparatus of Fig. 6;

Fig. 8 is a directive pattern corresponding to the intensity distribution of energy radiated by the rotating transmitting antenna of Fig. 5;

Figs. 9, 10 and 11 are oblique, elevation and sectional views of an antenna unit suitable for transmitting the pattern of Fig. 8;

Fig. 12 is a plan view of an alternative antenna arrangement for this purpose; and Fig. 13 is a diagram of a relay interconnection modification applicable to Fig. 6.

Referring now particularly to Fig. 1, the radio frequency oscillator 11 and radio frequency amplifier 13 constitute basic elements of an omnidirectional range transmitting system, i. e., a system for enabling aircraft to determine their bearings as observed from the ground station. The radio frequency power from amplifier 13 is supplied through a feed line 15 to the antenna system 17 which has an asymmetrical directivity pattern such as a heart-shaped azimuthal pattern 18. The antenna system 17 is rotated at a regular rate, e. g., at 55 revolutions per second. By virtue of the asymmetry of the pattern 18, an aircraft receiver tuned to detect energy from the transmitter 11, 13, receives a signal which is amplitude modulated substantially sinusoidally at the frequency of rotation of the antenna 17, i. e., 55 cycles per second in the above illustration.

In order that the operator of the aircraft 21 shall be enabled to determine the azimuthal bearing of a line from the location of the antenna 17 to his craft, a reference-phase modulation system is incorporated in the transmitting system. This reference phase modulation system may take any form which permits the receiving system to distinguish unambiguously between the reference phase modulation and the amplitude modulation due to antenna rotation. Such distinguishability may be based on frequency modulation of the transmitted radio-frequency energy according to the reference phase wave, as set forth in U. S. Patent 2,377,902 to M. Relson, or it may be based on a frequency conversion to such a frequency range as to provide frequency band selection between the rotational modulation and the reference phase wave.

A suitable arrangement according to the latter method is incorporated in Fig. 1. It comprises a generator 23 linked to the antenna 17 as indicated at 25, and arranged to provide a sinusoidally varying output voltage of the frequency of rotation of the antenna 17, and of fixed phase relative thereto. An output circuit of the generator 23 is coupled to the control terminals of a frequency modulator 27, and modulator 27 is connected to produce frequency modulation of a sub-carrier modulator 29, the latter in turn being arranged to modulate the radio frequency amplifier 13 at a first sub-carrier frequency.

For the selective annunciator operation, the output of generator 23 is supplied through a phase shifter 31 to a further frequency modulator 33 arranged for frequency modulating a further sub-carrier modulator 35, which is arranged to superimpose yet a further modulation on the radio frequency energy produced by amplifier 13. If desired, a signalling key or switch 37 may be provided for rendering the chain of elements 31, 33, 35 effective when desired. This key may be used for sending Morse code impulses. The sub-carrier frequencies of modulators 29 and 35 are two different frequencies, both ordinarily being in an appreciably higher frequency range than the rotation frequency (in revolutions per second) of the antenna 17.

The receiver system carried aboard the aircraft 21 is illustrated in Fig. 2. A receiver 41, which may be an ordinary superheterodyne receiver with automatic volume control features, is arranged to supply its demodulated output signals to three band-pass filters 43, 45 and 47. Filter 43 is arranged for selecting the amplitude modulation component of the received energy having the frequency of the rotation of antenna 17. This band-pass filter supplies its output to an amplifier 49, and the output of amplifier 49 hence corresponds to the intensity modulation resulting from the rotation of the antenna 17 with its asymmetrical horizontal-plane directivity pattern 18.

Band-pass filters 45 and 47 are tuned to select the respective sub-carrier frequencies of the sub-carrier modulators 29 and 35. The output circuits of these band-pass filters are coupled directly or through conventional amplifier stages to limiter amplifiers 51 and 53, respectively, which supply constant-amplitude voltages to frequency discriminators 55 and 57, respectively. The first frequency discriminator 55 supplies at its output terminals a sinusoidal voltage of phase fixedly corresponding to the output of phase reference generator 23. By phase comparison between the output of frequency discriminator 55 and the output wave from amplifier 49, the operator in the aircraft 21 is provided with an unambiguous indication of the azimuthal direction of his aircraft as observed from the transmitting station. For this purpose the receiving system may include a phase comparator unit 59 such as that described in U. S. Patent No. 2,370,692 issued March 6, 1945, to J. E. Shepherd. Such an indicator provides a direct reading of aircraft bearing.

For simplicity, generator 23 (Fig. 1) may supply to the input terminals of frequency modulator 27 a phase voltage which is cophasal with the amplitude variations due to rotation of the antenna 17 as observed by an aircraft directly north of the antenna 17. Thus, the phase separation between the output waves from discriminator 55 and amplifier 49 is zero when the aircraft is due north, 90° when the aircraft is east of the antenna, 180° when it is south of the antenna, and 270° when it is west of the antenna, the phase angle corresponding fully with the conventional azimuthal direction designations. Omni-azimuthal range systems involving the transmission of a reference phase wave and the comparison therewith of an antenna pattern modulation wave resulting from antenna pattern rotation have been hitherto devised, and the principal features of the present invention reside in the provision of the annunciator now to be particularly described.

The phase relation between the output wave from discriminator 57 and the reference phase demodulation signal from discriminator 55 is directly and solely dependent upon the setting of the phase shifter 31 (Fig. 1). An operator at the fixed station therefore can manipulate the phase shifter knob of unit 31 to cause the output voltage from discriminator 57 to bear a predetermined significant phase relation to the phase of the output of amplifier 49 for a craft in a desired azimuthal direction.

Apparatus responsive to discriminator 57 and amplifier 49 is provided in the craft receiving system of Fig. 2 to be actuated when the predetermined significant phase relation exists between the output wave of discriminator 57 and the output wave from amplifier 49. This apparatus may include clipper stages 61 and 63 respectively coupled to the output circuits of amplifier 49 and discriminator 57, and differentiator circuits 65 and 67 supplied by the clipper stages and coupled to the input circuits of a coincidence apparatus 69. (See also Fig. 3.) The clipper stages 61 and 63 may comprise well known high gain amplifiers arranged for grid and plate limiting, so that they provide output waves of substantially square wave form. The differentiator stages 65 and 67 may comprise resistance-capacitance coupled amplifier circuits, the coupling resistance and capacitance values being selected for very short time constants, so that these stages are limited in their response to the moments of rapid voltage change in the output waves of the respective clipper stages.

Figure 3:
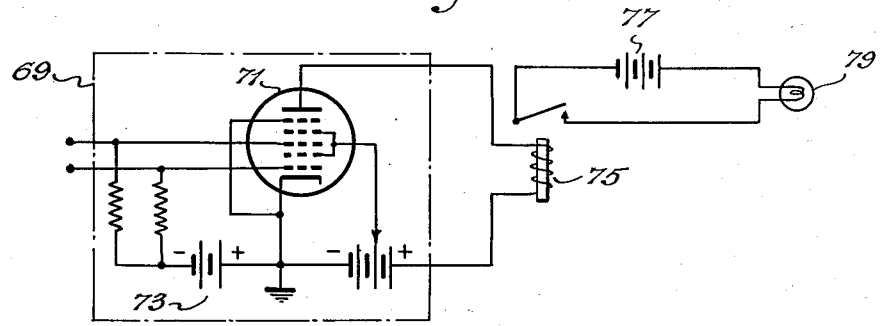
Fig. 3 is an illustration of a coincidence circuit suitable for employment in the apparatus illustrated in Fig. 2.

The coincidence circuit 69 is so arranged as to provide output current only when both input circuits thereof are actuated simultaneously by positive pulses, and the negative alternate pulses from differentiator stages 65 and 67 as well as non-coincident positive pulses are ineffective to actuate the output circuit of the coincidence unit 69. A typical arrangement of the coincidence unit 69 is illustrated in Fig. 3. This unit includes a pentagrid tube 71 having its first and third grids each biased for plate current cut-off by a bias source 73. These grids are coupled to the respective input circuits. When the negative bias of only one of these grid circuits is momentarily overcome by a positive pulse, the tube 71 remains unable to conduct anode current unless the other of the two control grids is simultaneously energized by a positive voltage. The anode circuit of the pentagrid tube 71 is connected to the control coil of a relay 75 which may have its control terminals connected in series with a battery 77 and an annunciator, e. g. a lamp 79, or an audio device, if preferred.

Figure 4:
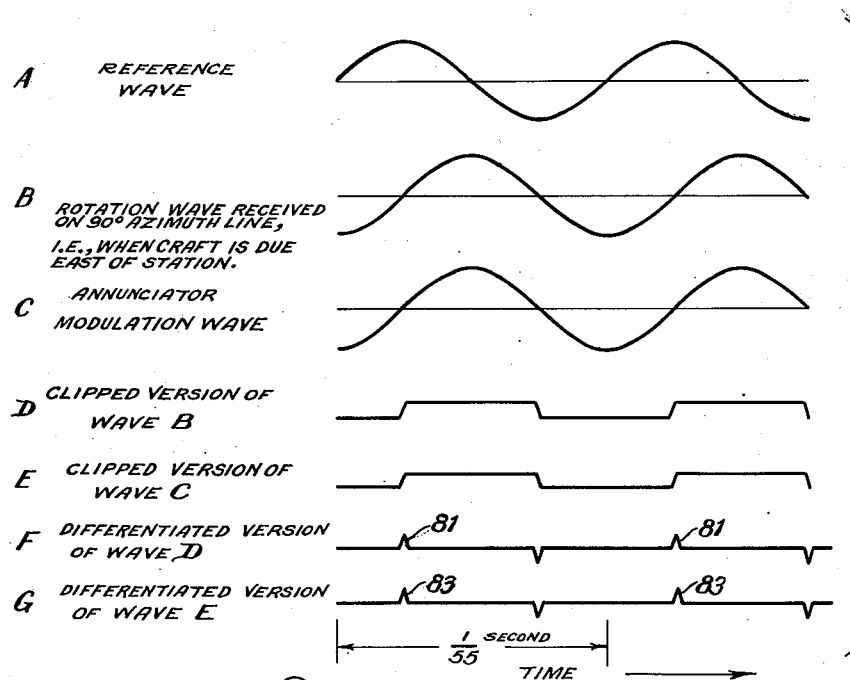
Fig. 4 is a series of graphs indicating the manner in which the present invention operates.

The operation of the system illustrated in Figs. 1–3 may be more clearly understood by reference to the graphs in Fig. 4, wherein a common time scale is employed. Graph A represents the sinusoidal output voltage supplied by the reference phase winding of generator 23 to the frequency modulator 27, and hence is similarly representative of the phase of the demodulation voltage at the output terminals of discriminator 55. Wave B is an illustrative sinusoidal wave corresponding to the low-frequency component of the demodulation wave produced by receiver 41 when the aircraft is due east of the antenna 17, the wave B being delayed 90° relative to the reference wave A. Wave C corresponds to the output wave produced by phase shifter 31 (Fig. 1) when the knob thereof is set for communication with an aircraft at 90°, i. e., an aircraft due east of the antenna 17. Accordingly, the annunciator modulation wave C is cophasal with the antenna rotation wave B only for aircraft due east of the fixed-station antenna 17.

Under these conditions, the clipper stages 61 and 63 (Fig. 2) of the craft on the 90° azimuthal bearing receive sinusoidal waves which are cophasal, as illustrated at B and C of Fig. 4. These clipper stages produce cophasal square waves D and E by virtue of their clipping or limiting action. The differentiator stages 65 and 67 when supplied with the cophasal waves D and E produce cophasal pulse waves such as are illustrated at F and G, each wave being characterized by one sharp positive excursion and one sharp negative excursion per cycle. As the control grids of the pentagrid converter 71 (Fig. 3) both are biased to cut off, this tube is entirely unaffected by the negative excursions of the differentiator waves F and G. Furthermore, as outlined above, it is necessary that the positive excursions 81 and 83 of these waves occur in coincidence, for the tube 71 to be rendered momentarily conductive. As indicated in Fig. 4, positive excursions 81 and 83 are coincident in the craft directly east of the station by virtue of the phase coincidence in such craft of the directional modulation wave B and the the annunciator modulation wave C, and accordingly, the annunciator circuit in this craft is actuated. For craft in other directions from the antenna 17, the positive excursions of the differentiator output waves are not coincident and accordingly the annunciator circuits in those craft are not responsive. As will be apparent from the foregoing description, however, the fixed station operator may change the setting of the phase control knob on phase shifter 31 to signal aircraft in any desired direction from the antenna 17. The direction in which an aircraft receiving the signals will be annunciated is shown by the position of the pointer or phase shifter 31 on its calibrated phase scale.

Figs. 5 and 6 illustrate an embodiment of the present invention wherein very great precision in azimuthal selection may be achieved through the use of a rotated pattern basically similar to that illustrated at 18 in Fig. 1 but characterized by a scalloped fringe (see Fig. 8) of such character as to cause the signals received at a selected receiving point to be modulated not only according to a component at the frequency of rotation of the transmitting antenna but also at a component frequency of n times the rotation frequency of the antenna, where n scallops or fingers are present around the pattern fringe. "Fine" and "coarse" phase reference signals are transmitted for comparison in a suitable phase comparison circuit with the high frequency and low frequency components, respectively, of modulation due to antenna rotation, so that an azimuth indicator 59' (Fig. 6) may be positioned with extreme accuracy. Further fine and coarse signals, phase shifted according to the will of an operator at the fixed transmitting station, are transmitted and employed for controlling a servo mechanism which controls a contact switch cooperating with the azimuth direction indicator 59'.

The transmitting system shown in Fig. 5 includes an oscillator and frequency multiplier 101, from which the output energy is supplied to the excitation circuit of a radio frequency amplifier 105 having its output circuit arranged to drive a radio frequency power amplifier 107. The power amplifier 107 supplies ultra high frequency (e. g. 5000 megacycles) output power to a rotatably supported antenna system 109 arranged to be rotated at high speed by a driving motor 111.

The transmitting antenna 109 is illustrated in Fig. 5 as constructed in a shape generally resembling a vertical-axis drum and the details of this antenna may be as shown in Figs. 9–11 or Fig. 12, for producing an azimuthal radiant energy distribution pattern generally according to Fig. 8.

The transmitting antenna 109 may take any of a wide variety of forms provided that it accomplished the provision of a radiation pattern substantially as shown in Fig. 8. This pattern is characterized by an 11-fingered scallop plan. Such a pattern may be produced by the use of a "triple-dipole" antenna with a shunted feeder and a special pattern fringe modifier, as shown in Figs. 9, 10 and 11. Three arcuate doublet or dipole elements are provided, each having two symmetrical arcuate arms supported on parallel conductive bars extending outward from the outer sheath 403 of a coaxial feed line. Alternate arcuate arms are connected to the inner conductor 405 of the coaxial line by radial conductors passing through clearance holes in sheath 403. These three arcuate dipole elements, together, constitute a "triple-dipole" radiator 401.

A short-circuiting stub 407 is provided between the radial feed connection to the arcuate arm of one of the arcuate dipoles 409 and the supporting bar for the other arcuate arm, for distorting the general pattern of the triple-dipole unit from a substantially circular azimuthal pattern to a substantially heart-shaped or limaçon-like directivity pattern illustrated in dotted line at 42 in Fig. 8. The triple-dipole unit is positioned at the middle of a drum formed with upper and lower conductive plates 411 and 413, which serve together as a wave guide for guiding the energy from the centrally located triple-dipole unit 401 to the peripheral aperture. Vertical columns or staves such as column 415 are provided for distorting the fringe of the heart-shaped pattern in such a manner as to provide the scallops or plural fingers therearound for achieving the "fine-and-coarse" control features. These vertical bars may be made of dielectric material or of a semi-conductor, as desired, the fringing being accomplished by any such elements as will cause regular alternations around the pattern of the phase velocity of energy emerging between the peripheries of plates 411 and 413. The resulting multi-fingered and asymmetrical pattern is illustrated at 44 in Fig. 8.

The scallops or fingers around the pattern alternatively may be provided by modifying the plates 411 and 413 as illustrated in Fig. 12, the outlines of these plates being scalloped somewhat similarly to the desired radiation pattern. Here, again, the pattern scalloping is achieved through controlling relative phase velocities along the various radial lines from the central region of the structure.

The features of the antenna unit of Fig. 12 are set forth and claimed in Litchford application Serial No. 782,721, filed October 29, 1947, Patent No. 2,567,220, granted September 11, 1951.

Referring again to Fig. 5, two alternating voltage generators 113 and 115 are coupled to antenna 109 so that their rotors revolve in fixed relation therewith. These generators may comprise permanently magnetized rotors and cooperating stator output coils. Generator 115 is provided with a two-pole permanently magnetized rotor, while generator 113 is provided with a rotor characterized by $n$ pairs of poles, or a stator made up of $n$ dual-pole sections connected together. Each of these units 113 and 115 may be provided with a set of polyphase output coils. Generator 115 produces polyphase output voltages at the frequency of rotation of antenna 109, while generator 113 produces polyphase output voltages of $n$ times the frequency of rotation. A selected phase voltage from generator 115 provides a reference for comparison with the rotation frequency modulation component due to the general heart shape of the antenna pattern, and one output phase voltage of generator 113 provides a phase reference signal for phase comparison with the high frequency modulation component due to the $n$ scallops around the fringe of the directional pattern.

These reference phase voltages from generators 113 and 115 are added and amplified in unit 117, and impressed by frequency modulation upon a subcarrier signal generated in an oscillator unit 119. This frequency modulated sub-carrier signal is in turn supplied to the input terminals of an amplitude modulator 121 coupled to unit 105 for introducing sub-carrier modulation into the output energy radiated through antenna 109.

The portions of the transmitting equipment thus far described form a transmitter system which can be depended upon for precise azimuth direction determination by suitably equipped craft. A corresponding receiving system and azimuth direction indicator is set forth in Fig. 6. A craft radio receiver 131 having a wide band detector output circuit is coupled to the input circuits of three band-pass filters 133, 135 and 137. The last of these filter units, filter 137, is designed to respond to the sub-carrier output frequency of sub-carrier generator 119 (Fig. 5), for selecting the demodulation component of the received signal which is due to the sub-carrier modulation in the fixed station system. This selected demodulation signal is supplied to an amplifier, limiter and discriminator arrangement 139 of conventional design for frequency modulation reception, and this unit supplies at its output terminals the demodulation components corresponding to the voltages impressed by generators 113 and 115 (Fig. 5) on unit 117.

The demodulation output voltage from unit 139 is supplied to the input circuits of band-pass filters 141 and 143. Band-pass filters 133 and 141 are designed to pass voltage components of the frequency of the output of generator 113; and filters 135 and 143 are tuned to the antenna rotation frequency, i. e., to the generation frequency of generator 115.

A servo system is provided for angularly positioning a directional chart table 145 in indicator 59' generally according to the phase relation between the outputs of band-pass filters 135 and 143 and precisely according to the phase relations between the output voltages of band-pass filters 133 and 141. This servo system includes a servomotor 147 coupled through a gear train 149 to the vertical shaft 151 of the rotary azimuthal direction table 145, and an amplifier 153 for supplying reversible-polarity excitation power to the control voltage input terminals of the motor 147.

A first variable transformer 161 is provided with its rotor connected directly to the shaft 151 and a second variable transformer 163 is coupled through gears 164 and 166 to the shaft 151, the gear ratio being equal to the factor $n$. These variable transformers 161 and 163 are units of the telemetering transmitter type, for example selsyns. The rotor windings of these units are connected to the output circuits of band-pass filters 143 and 141, respectively, and their respective multi-component output circuits are connected to fixed phase shift combining networks 165 and 167 (as shown in Fig. 7).

Fig. 7 shows a selsyn unit 161 connected to fixed phase shift circuits 316 and 317 and coupled through these circuits to the summation circuit including elements 321 and 324. Circuits 316, 317 and elements 321 and 324 together comprise a combining network unit such as that indicated at 165 in Fig. 6. This diagram illustrates the circuit interconnections likewise typical of phase shifter system 163, 167 and similarly typical of systems 261, 265 and 263, 267.

Units 316 and 317 are phase shifting networks designed to produce opposite phase shifts totalling 120° phase difference, so that the voltages at terminals 318 and 319 are added as 120°—separated components of relative magnitudes controlled according to the angular position of the knob 325. These components are combined through a high-value center-tapped resistor 321 and a relatively low-resistor 324 to produce a voltage across resistor 324 representing a phase shifted version of the alternating voltage 312 shifted through an angle as represented by the pointer position of the knob 325. Such a phase shifting interconnection as illustrated in Fig. 7 is described and claimed in application Serial No. 729,852, J. E. Browder et al., filed February 20, 1947, and assigned to the assignee of the present invention.

The output circuits of networks 165 and 167 are each connected to a first input circuit of respective phase sensitive detectors 171 and 169. The second input circuit of detector 171 is supplied with the output of band-pass filter 133, and the second input circuit of phase detector 169 is supplied with the output of band-pass filter 135. The output circuits of the phase detectors are coupled to the motor supply amplifier 153, for controlling the speed and direction of rotation of turntable 145 through the operation of the servomotor 147. The connections of the phase detectors with the motor amplifier 153 and the arrangement of the phase shifters 161, 163 and combining networks 165, 167 are such that the motor 147 is made to operate in direction and extent as required to maintain the turntable 145 positioned in azimuthal direction generally according to the phase relation between the outputs of filters 135 and 143 and more precisely according to the phase relation between the outputs of filters 141 and 133.

When the angular position of the turntable 145 is in accord with the bearing of the aircraft from the fixed station, the signals supplied to phase detector 169 directly from band-pass filter 135 and through the phase shifter system 161, 165 from band-pass filter 143 are approximately in the phase relation for zero output from unit 169, and hence the output of this unit is inappreciable. Furthermore, under these conditions, the phase relation between the signal supplied directly from band-pass filter 133 to phase detector 171 and the signal supplied through the phase shifter system 163, 167 from band-pass filter 141 will be such as to produce zero output of phase detector 171. Accordingly, the motor 147 remains inactive, and therefore the turntable 145 remains angularly fixed its angular orientation denoting the bearing of the craft as observed from the fixed station.

If there is appreciable angular disparity between the indicated direction momentarily presented by the direction table 145 and the actual azimuthal bearing of the aircraft from the fixed station, then the phase relation between the signal fed directly from band-pass filter 135 to phase detector 169 and the signal supplied by band-pass filter 143 and shifted in phase shifter system 161, 165 will be such as to produce an appreciable voltage at the output terminals of phase detector 169. This phase detector output voltage is of such polarity as to cause the motor 147 to turn the table 145 in the direction to restore a condition of substantial angular accord of table 145 with the azimuthal bearing of the craft. Then, until the turntable 145 has been brought to the orientation exactly according to the bearing of the craft, the signal fed directly from band-pass filter 133 and that shifted through units 163 and 167 are in such phase relation that unit 171 provides an output signal compelling motor 147 to continue driving the turntable 145 until the angular setting is the exact representation of craft bearing.

While the present system can be successfully operated with direct addition of the outputs of the phase detectors 169 and 171 in supplying the motor amplifier 153, it is preferable that the coupling arrangements between the input circuit of the amplifier 153 and the output circuits of units 169 and 171 be so arranged as to suppress or eliminate the contribution from phase detector 171 and to emphasize the contribution from phase detector 169 when the output from unit 169 is appreciable due to a very large angular disparity; and to suppress or shut out the output of phase detector 169 and carry through the output of phase detector 171 when the angular position of turntable 145 is approximately correct, as indicated by the decrease of the output voltage of phase detector 169 to a very low value. In this way, the azimuth position-representing apparatus can be made to be controlled precisely according to the scallop modulation signal and substantially independently of the general pattern frequency component during such time as approximate angular accord of the turntable prevails, as indicated by the output from phase detector 169 remaining in a relatively low range.

For the above purpose, an illustrative coupling arrangement may employ ordinary resistors 177 and 179 connected in series with nonlinear resistors 181 and 183, respectively, in the output circuits of the phase detectors 169 and 171, the control voltage for amplifier 153 being made up as the sum of the voltage drops across resistor 177 and nonlinear resistor 183. Nonlinear resistors 181 and 183 are illustrated as being of the copper oxide rectifier type, each comprising a pair of oppositely connected rectifier elements in order to avoid overall rectification and asymmetrical operation of the phase detector output circuits with respect to the reversible-polarity motor control signals. These nonlinear circuits 177, 181 and 179, 183 act substantially as a relay operating according to the output strength of phase detector 169 to cause the output thereof to be connected to the input circuit of amplifier 153 in place of the output circuit of phase detector 171 when detector 169 provides excessive output voltage.

If preferred, a control circuit may be arranged for positively selecting the output of one of the phase detectors 169, 171 and totally excluding the other from exercising any influence on the operation of the servomotor 147. An arrangement for this purpose is illustrated in Fig. 13, where a relay 170 is shown employed in the interconnections of elements 169, 171 and 153 instead of the nonlinear circuits of Fig. 6.

The actuating coil of the relay 170 is connected across the output circuit of phase detector 169, and the armature is arranged as a double-throw switch for selecting between the two phase detectors. When unit 169 provides a substantial output voltage, the armature is pulled downward, so that the input circuit of unit 153 is supplied solely by this phase detector 169. When the resultant motor operation has brought the azimuth direction indicator nearly into the proper direction, the output voltage of phase detector 169 is so decreased that the armature is released, and moves up to substitute the output circuit of phase detector 171 in full control of the amplifier 153 and servomotor 147. The servomotor 147 is thereby operated to the further extent to bring the azimuth direction indicator into perfect accord with the craft direction, when through the operation of the phase shifters connected thereto the output of phase detector 171 is reduced to zero. For best operation with this arrangement, the number $n$ of fingers in the radiation pattern should be an odd number, e. g. 11.

The portions of Figs. 5 and 6 thus far described accomplish azimuth representation on board a craft according to its bearing from the fixed station, as described and claimed in copending application Serial No. 782,722, filed by the present inventors, October 29, 1947, Patent No. 2,564,703, granted August 21, 1951, and assigned to the assignee of the present invention.

Turning again to Fig. 5, a pair of variable phase shifters 201 and 203, e. g. selsyn units, having their shafts intercoupled through $n$-ratio gears 205, 207 are connected to the output circuits of generators 113 and 115, respectively. The output circuits of these phase shifters are connected in series and their sum-voltage terminals are connected to the input circuit of an amplifier and frequency modulator 211 coupled to an oscillator 213. The output circuit of oscillator 213 drives the input circuit of a radio frequency power amplifier 215 which is coupled to an antenna 217 for radiating, in a broadcast pattern, energy modulated according to phase shifted versions of the output voltages of generators 113 and 115.

A lever 219 is provided for adjusting the phase shifters 201, 203 to a selected azimuth setting as indicated by the pointer and scale 221, and a signalling key 223 may be connected to the transmitter 213, 215 for timing the emission of selective azimuthal signalling or annunciator energy.

The craft equipment (Fig. 6) includes a receiver 231 tuned to the frequency of the transmitting system 213, 215 for receiving the energy radiated by antenna 217. The output circuit of this receiver 231 is connected to the input circuits of band-pass filters 233 and 235, which in turn are connected to the input circuits of phase detectors 271 and 269 respectively. The phase reference input circuits of these phase detectors are supplied through phase shifter systems 263, 267 and 261, 265 in a manner similar to the arrangements in the servo control portion of the aircraft receiving system for positioning the table 145. An amplifier 253 and a servomotor 247 coupled through gear train 249 are provided for rotating a contact arm 245 according to the phase shifts introduced by the fixed station operator through the adjustment of phase shifters 201, 203 in Fig. 5. This second servo system operates in a manner paralleling the operation of the servo system driving turntable 145, to make the arm 245 take an angular position corresponding to the phase relations between the outputs of units 201, 203 and the outputs of units 113, 115 (Fig. 5), and hence corresponding to the angular direction denoted on scale 221 in Fig. 5.

If the craft equipped with the receiving system of Fig. 6 lies in the azimuthal direction to which the fixed station operator has set the dial 221, then the contact arm 245 is aligned by this second servo system with a cooperating contact element 246 coupled to the azimuthal turntable 145. An annunciator circuit including a source 280, a lamp or other signalling device 282, and a relay 284 for actuating any further circuits is connected to the contact elements 245, 246. A further relay 288 may be coupled by a filter 290 to the output circuit of the receiver 231, to complete the annunciator circuit only when the receiver 231 is responding to transmitter 211, 213, 215 (Fig. 5) and hence only when key 223 is closed. This condition can only prevail during the time when the craft bearing corresponds to the setting of dial 221.

The system illustrated in Figs. 5 and 6 thus operates generally in the same manner as the system of Figs. 1 and 2, but provides the positive control advantages of servo mechanism for effecting the annunciator contact between elements 245 and 246 according to the manipulations of the operator at the fixed station, and furthermore, this system achieves very high precision in its selective azimuth control by virtue of the compounding of the fine and coarse phase shift control features.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In combination, means for transmitting from a station radio energy receivable over a wide range of azimuthal directions from the station, the energy being modulated in each azimuthal direction in a phase distinguishing that azimuthal direction from others, means including a frequency modulator for transmitting a further signal component of modulation frequency equal to the frequency of said modulation in azimuthal directions and of adjustable phase, the phase of said further signal being adjustable through a range corresponding to the range of phase variation of the modulation of said radio energy throughout the 360° azimuthal range, radio receiving means responsive to both said means for providing first and second output components corresponding to the modulation in the azimuthal directions and the frequency modulation, respectively, and means responsive to said first and second components for selectively responding to a predetermined phase therebetween.

2. In combination, means for transmitting from a station radio energy receivable over a wide range of azimuthal directions from the station, said transmitting means including means for modulating said energy so that the modulation phase of energy emerging in a given direction is directly dependent upon the azimuth direction, means coupled to said energy transmitting means for transmitting a further signal component of frequency equal to the frequency of said modulation and of adjustable phase, radio receiving means responsive to both said means for producing first and second voltages of equal frequencies and of phase relation dependent upon the azimuth direction of reception and the phase adjustment of said second means, and circuit actuation means responsive to said first and second voltages for selective operation in response to a predetermined phase relation between said first and second voltages and for remaining inactive throughout other phase relations therebetween.

3. In combination, means including a rotatable antenna with an asymmetrical azimuthal pattern for transmitting from a station radio energy receivable over a wide range of azimuthal directions from the station, said means including means for imparting regular rotation to said antenna for providing a first modulation of the energy in each azimuthal direction in a phase distinguishing that azimuthal direction from others, and means coupled to said transmitting means for modulating said energy according to a further modulation of the frequency of said first modulation and of adjustable phase, the phase of said further modulation being adjustable to a predetermined phase relation with said first modulation for any selected direction within said range of azimuthal directions, and said further modulation being of character distinguishable from said first modulation.

4. In combination, means for transmitting from a station radio energy receivable over a wide range of azimuthal directions from the station, said means including means to provide a first modulation of the energy in each azimuthal direction in a phase distinguishing that azimuthal direction from others, and means coupled to said transmitting means for superimposing upon said transmitted energy second and third modulations each conveying a modulation wave of the frequency of said first modulation, said second modulation being of fixed reference phase whereby a phase comparison between the demodulated version thereof and the demodulated version of said first modulation is unambiguously indicative of the azimuth direction of reception, and said third modulation being a phase adjustable through a phase shift range corresponding with said wide range of azimuthal directions whereby the demodulation wave resulting from said third modulation may be adjusted at said station to a predetermined selected phase relation with the demodulated version of said first modulation for designating an azimuthal direction as a desired communication direction.

5. In combination, means for transmitting from a station radio energy receivable over a wide range of azimuthal directions from the station, said means including means to provide a first modulation of the energy in each azimuthal direction in a phase distinguished from the first modulation phase in other directions, means coupled to said transmitting means for superimposing on said energy second and third modulations each conveying a modulation wave of the frequency of said first modulation, the phase of said second modulation being fixed as a reference phase for azimuth direction determination by said first modulation, and the phase of said third modulation being adjustable over an appreciable phase shift range for enabling said third modulation to be brought into a predetermined phase relation to said first modulation in a selected azimuth direction, and radio receiving means responsive to said energy for selective demodulation thereof to produce first, second and third demodulation waves corresponding respectively to said first, second and third modulations, said receiving means comprising means for detecting the phase relation between said first and second demodulation waves to determine the azimuthal direction relative to said station, and means responsive to a predetermined phase relation between said first and third demodulation waves for indicating that said radio energy is received along an azimuth direction selected at said station.

6. In combination, means for transmitting from a station radio energy receivable over a wide range of azimuthal directions from the station, said means including means to provide a first modulation of the energy in each azimuthal direction in a phase distinguished from the first modulation phase in other directions, means coupled to said transmitting means for superimposing on said energy second and third modulations each conveying a modulation wave of the frequency of said first modulation, the phase of said second modulation being fixed as a reference phase for azimuth direction determination by said first modulation, and the phase of said third modulation being adjustable over an appreciable phase shift range for enabling said third modulation to be brought into a predetermined phase relation to said first modulation in a selected azimuth direction, and radio receiving means responsive to said energy for selective demodulation thereof to produce first, second and third demodulation waves corresponding respectively to said first, second and third modulations, said receiving means comprising a switch having first and second cooperating elements, means responsive to said first and second demodulation signals for positioning the first of said elements angularly according to the phase angle between said first and second demodulation signals, and means responsive to said second and third demodulation waves for positioning the second of said elements angularly according to the phase angle therebetween, whereby said elements are brought into cooperation only when said first and third demodulation signals are in predetermined phase relation.

7. In combination, radio receiving means for amplification and demodulation of radio energy received from a multiple modulation transmitting station, means coupled to said receiving means for selecting from the output of said receiving means first, second and third demodulation waves of equal frequencies, azimuth direction indicating means jointly responsive to said first and second demodulation waves for producing an azimuth indication according to the phase relation therebetween, and annunciator means jointly responsive to said first and third demodulation waves and actuatable by a predetermined phase relation therebetween for indicating the presence of said predetermined phase relation.

8. The combination of elements defined in claim 7, wherein said azimuth direction indicating means comprises a first rotatable element and means for positioning said rotatable element angularly according to the phase relation between said first and second demodulation waves, said rotatable element including a contact member thereon displaced from the axis of rotation, and said annunciator means comprises a further rotatable element arranged for rotation about the axis of rotation of said first rotatable element and including a contact member for cooperation with the contact member on said first rotatable element, and means for positioning said further rotatable element angularly according to the phase relation between said first and third demodulation waves, whereby said contact members are brought into engagement when a predetermined phase relation is produced between said second and third demodulation waves.

9. In combination, means for transmitting radio energy in an assymmetrical pattern from a transmitting station, means for producing regular rotation of said asymmetrical directional pattern at a predetermined rotation frequency for causing a first modulation of said transmitted energy at the frequency of said rotation, means for transmitting a further signal of frequency equal to the frequency of said rotation and of adjustable phase, the phase of said further signal being adjustable to a predetermined phase relation with the amplitude modulation resulting at a selected azimuth direction from said rotation, and radio receiving means for phase comparison of the amplitude modulation of said radio energy and said further signal, and means coupled to said receiving means and including means responsive to a predetermined phase relation between said waves for indicating reception of energy along the azimuth direction selected at said station.

10. A movable craft signalling system comprising means for transmitting radio energy in an azimuthally asymmetrical pattern, means for producing regular rotation of said pattern about a vertical axis, means for generating a reference phase signal having a component at the frequency of rotation of said pattern, whereby any azimuth direction from said transmitting means is characterized by intensity modulation resulting from and phased according to rotation of said pattern, the azimuth direction being characterized by a significant phase relation between said modulation and said reference phase signal, means responsive to said reference phase signal generator for providing a variably phase shifted version of said reference phase signal, and means for transmitting a radio energy modulation according to said variably phase shifted version, said first means comprising means for transmitting a multi-fingered or scalloped pattern of $n$ fingers, said reference phase signal providing means including means providing a phase reference component of $n$ times the frequency of rotation of said pattern, and said means for providing a variably phase shifted version comprising dual phase shifting means for shifting the rotation frequency component through a selected angle $\theta$ and the component at $n$ times rotation frequency through the angle $n\theta$.

11. In combination: means for generating radio frequency carrier power; means for radiating said power from a station in a range of azimuthal directions, said last-named means including means for providing amplitude modulation of the radiated power with the modulation phase of the energy in each azimuthal direction distinguished in phase from the modulation of the radiated power in the other azimuthal directions; means including a frequency modulator for superimposing on said power a modulation component of frequency substantially equal to the frequency of said amplitude modulation; means for receiving a portion of said power and providing first and second signal output components corresponding respectively to said amplitude modulation and said superimposed modulation component; selective control means responsive to said last-named means for providing an output indication only when said first and second signal output components are in a predetermined mutual phase relation, and means at said station for varying the phase relation between said amplitude modulation and said superimposed modulation component to selectively control the direction in which said control means are actuated.

GEORGE B. LITCHFORD.
JOSEPH LYMAN.

REFERENCES CITED

The following references are of record in the file of this patent:

UNITED STATES PATENTS

| Number | Name | Date |
|---|---|---|
| 1,922,677 | Greig et al. | Aug. 15, 1933 |
| 2,252,699 | Byrne | Aug. 19, 1941 |
| 2,253,958 | Luck | Aug. 26, 1941 |
| 2,302,102 | Kandoian | Nov. 17, 1942 |
| 2,313,048 | Byrne | Mar. 9, 1943 |
| 2,368,318 | Muller | Jan. 30, 1945 |
| 2,377,902 | Relson | June 12, 1945 |
| 2,387,902 | Eggers | Oct. 23, 1945 |
| 2,406,396 | O'Brien | Aug. 27, 1946 |
| 2,420,605 | McConnel | May 13, 1947 |